United States Patent [19]
Deverin

[11] 4,085,576
[45] Apr. 25, 1978

[54] MONOCRYSTALLINE DISPLAY DEVICE WITH STORAGE EFFECT FOR AN ELECTRONIC TIMEPIECE

[75] Inventor: Jacques Alain Deverin, Bienne, Switzerland

[73] Assignee: Societe Suisse pour l'Industrie Horlogere Management Services, S.A., Bienne, Switzerland

[21] Appl. No.: 504,891

[22] Filed: Sep. 11, 1974

[30] Foreign Application Priority Data

Sep. 27, 1973 Switzerland ................. 13824/73

[51] Int. Cl.² ............... G04C 3/00; G04B 19/06; G11B 9/02; G02B 5/23
[52] U.S. Cl. ............... 58/23 R; 58/127 R; 350/150; 365/117
[58] Field of Search ............... 350/150, 149, 154; 252/512, 513, 518, 519; 58/57, 127 R; 340/173.2

[56] References Cited
U.S. PATENT DOCUMENTS

| | | | |
|---|---|---|---|
| 3,374,473 | 3/1968 | Cummins | 350/150 |
| 3,661,442 | 5/1972 | Kumada | 350/150 |
| 3,799,647 | 3/1974 | Luft | 350/150 |
| 3,807,830 | 4/1974 | Luke | 350/150 |
| 3,838,906 | 10/1974 | Kumada | 350/150 |
| 3,854,278 | 12/1974 | Takeshita | 350/150 |
| 3,923,379 | 12/1975 | Kumada | 350/150 |
| 3,955,190 | 5/1976 | Teraishi | 350/150 |

*Primary Examiner*—Samuel W. Engle
*Assistant Examiner*—Donald P. Walsh
*Attorney, Agent, or Firm*—Griffin, Branigan and Butler

[57] ABSTRACT

Disclosed is an electronic timepiece display arrangement in which certain ferroelectric monocrystals having two stable optical states may be switched from one state to another by voltage pulses applied through electrodes. A polarizing filter is located past one face of the crystal and a reflecting surface is located past the opposite face. A second crystal and a second polarizer are employed in certain embodiments.

10 Claims, 6 Drawing Figures

MONOCRYSTALLINE DISPLAY DEVICE WITH STORAGE EFFECT FOR AN ELECTRONIC TIMEPIECE

The invention concerns a display arrangement exhibiting a storage effect for use with an electronic timepiece which timepiece includes a time standard, an electronic control circuit, an energy source and voltage increasing means wherein is provided at least one single domain ferroelectronic monocrystal belonging to a relatively low symmetry group in order to assure different optical properties for different orientation domains, electrode means arranged and adapted to apply voltage pulses from the control circuit to the crystal thereby to cause said crystal to change in a reversible manner from a first to a second stable state said first and second stable states being optically different, at least one polarising filter located proximate one face of the crystal and a reflecting or diffusing surface located proximate the opposite face thereof.

It is well-known that ferroelectric crystals may exhibit at least two electrically different stable states and they may be made to change from one state to another through application of an electric potential above a critical level referred to as coercive voltage. Such change-over is effected with a low energy consumption compatible with what may be drawn from the energy cell of an electronic timepiece such as a wristwatch.

Thus for example part of a ferroelectric crystal of barium titanate through application of a voltage thereto by means of electrodes may be placed in a state where a spontaneous polarisation - $P_s$ is directed along the same axis, but in an opposite sense to the polarisation $P_s$ of the remainder of the crystal; the two portions are referred to as antiparallel domains. It is well-known that the optical refraction properties of the two antiparallel domains are identical since the optical indicatrix (an ellipsoid characteristic of the refractive indices of the crystal) is non-polar and that the two domains may not be distinguished by means of observation through polarisation optics except perhaps for the separation wall which diffuses the light.

It is also known that in a crystal of barium titanate the spontaneous polarisation in one domain may be perpendicular to the polarisation of an adjacent domain and that the wall separating two domains at 90° may be displaced by means of an electric field directed along the polar axis of one of these domains; the volume of this latter increases or decreases according to whether the applied field renders it more or less favourable in energy terms. In such case the optical indicatrix of the domains are perpendicular and the two domains appear different when observed through crossed polarisers. Utilization of the properties of domains at 90° has already been proposed for displays in electronic watches (Swiss pat. No. 437 532). However, the manufacturing problems concerning crystals having two domains at 90° as well as the instability of these latter in the course of displacement of the separating wall have caused difficulties in practical application thereof. Thus this invention seeks to overcome these difficulties through utilization of ferroelectric crystals for which the optically distinguishable domains are characterized by spontaneous polarisations which are either reversible or reorientable, that is to say either antiparallel polarisations or polarisations at any angle other than 180°. Moreover, the display unit is formed from a single domain crystal in which is created or destroyed selectively one or more different domains thus avoiding the instability associated with the displacement of one or several preexisting domain walls. As examples (not limiting) the following well-known crystals may be mentioned:

1. Lead germanate, $5PbO \cdot 3GeO_2$, is ferroelectric below 177° C and belongs to the point symmetry class 3. Such class displays a phenonmenon of optical activity such as has been observed in lead germanate. Through application of an electric field the spontaneous polarisation $P_s$ may be reversed in a portion of the crystal and creates thus a domain which is antiparallel to the remainder of the crystal. The inversion of $P_s$ is accompanied by an inversion of the sign of the optical activity which is to say the change of the sense of rotation of the polarisation plane of the light which is passed through the crystal [H. Iwasaki et al, Appl. Phys. Lett. 18, 444 (1971) J. Appl. Phys. 43, 4907 (1972)]. It is thus evident that antiparallel domains may be demonstrated by placing a lead germanate crystal having a suitable thickness between two polarisers and that one may cause these domains to appear and disappear by means of a control voltage.

2. Bismuth titanate, $Bi_4Ti_3O_{12}$, is a ferroelectric crystal below 675° which belongs to the monoclinic symmetry class $m=c_{1h}$ The polar axis is located in the crystallographic plane a-c in a manner such that the spontaneous polarisation is resolved into two components $P_{sa}$ and $P_{sc}$ which may be independently inverted. One may thus reorient the spontaneous polarisation $P_s$ by separately inverting one of these components $P_{sa}$ or $P_{sc}$ as well as through simultaneous inversion of the two components. The inversion of $P_s$ is accompanied by an inversion of the optical indicatrix so that antiparallel domains cannot be distinguished when observed between crossed polarizers however, the reorientation of $P_s$ is accompanied by a switching of the indicatrix about the non-polar axis $b$ through an angle of about 58°. It is thus evident that two different orientation domains may be distinguished through use of the methods of polarisation optics [D. A. Tamboutsev et al, Spc. Phys.-Cryst. 8, 713 (1964); S. E. Cummins, J. Appl. Phys. 37, 2510 (1966); S. E. Cummins and L. E. Cross, Appl. Phys. Lett. 10, 14 (1967)].

The present invention exploits the properties of ferroelectric monocrystals of this type for the display of time in an electronic timepiece. The energy necessary for activation of these ferroelectric display modules is compatible with that available from a power cell used in a watch.

Certain crystals have moreover the advantage to be activable, (that is to say $P_s$ may be inverted or reoriented) by a voltage compatible with that used by the control electronics.

The attached drawings show by way of example various forms of the invention and are as follows.

Figure 1:
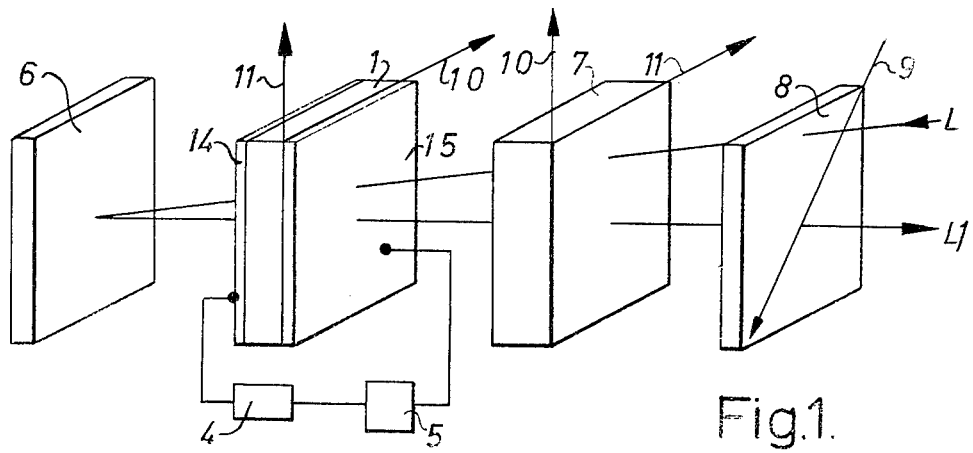
FIG. 1 and 1a show a schematic view of an arrangement with transparent electrodes producing an electric field parallel to the light beam.
Figure 1A:
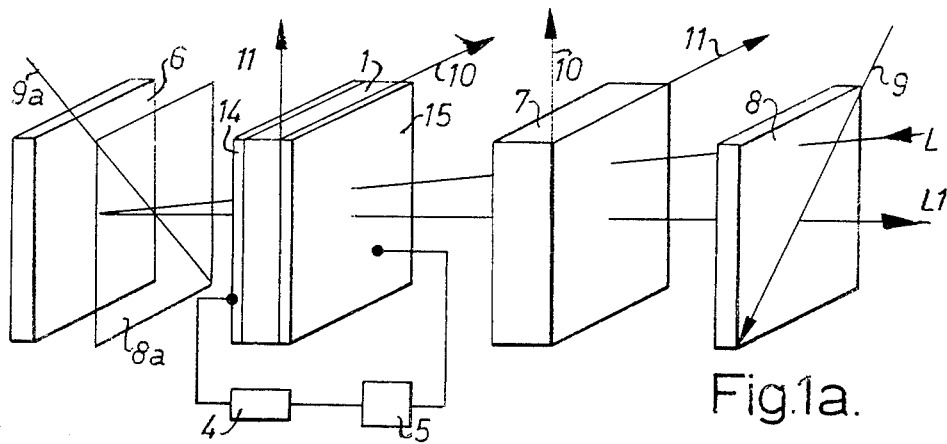

Referring first of all to FIG. 1 this arrangement according to the invention comprises: a ferroelectric crystal 1 of which the spontaneous polarisation $P_s$ or a component of $P_s$ may be inverted by means of an electric field applied by means of two electrodes, 14 and 15 coupled to an electronic control circuit 4 energized by a source 5; electrodes 14 and 15 thus produce a bipolar longitudinal electric field, which is to say parallel to the light beam L or $L_1$. Control circuit 4 may include among other elements a voltage increasing means which raises the voltage of source 5 (a dry cell for example) to the level necessary to switch the polarisation $P_s$ of crystal 1. Crystal 1 (referred to as the active crystal) is placed between a reflecting or diffusing surface 6 which returns the light beam L in the direction $L_1$ and a crystal 7, for which the chemical composition, the cut and the crystallographic orientation are identical to those of crystal 1, but which is not provided with electrodes. Crystal 7 is a compensating crystal and its geometric dimensions are at least approximately equal to those of crystal 1. If the dimensions of the two crystals 1 and 7 are identical, compensating crystal 7 either compensates or doubles the birefringence or optical activity of the active crystal 1 according to the orientation of the polarisation $P_s$ of crystal 1.

The arrangement further includes a polariser 8 for which the direction of polarisation 9 is at an angle of 45° relative to the fast and slow axes 10 and 11 respectively of crystals 1 and 7.

The principle of operation is the following: in what will be referred to as "0"-state crystal 1 has its polarisation $P_s$ directed parallel to L or $L_1$ which will be referred to as negative. For such direction of $P_s$ crystal 1 has its optical axes 10 and 11 crossed relative to those of compensating crystal 7. There thus results that the total birefringence of the two crystals is equal to the difference of the birefringence of each crystal and if such crystals have equal thickness in the direction of the light beam the total birefringence is zero, this being the case for all the wave lengths of the light. Practically all the light entering into the system will reappear from the polariser 8 on the return path $L_1$ and the system will thus appear clear.

Through application of a voltage impulse suitably chosen to the electrodes 14 and 15 of the active crystal 1, the direction of $P_s$ is inverted so that fast and slow axes 10 and 11 respectively of the active crystal are tilted, so that they are no longer parallel to the fast and slow axes of the compensating crystal. The total birefringence is no longer zero and a portion of the light is blocked by the polariser 9 on the return path $L_1$. In view of the dispersion caused by the birefringence only a portion of the spectrum will be blocked by polariser 8 and the system will appear coloured in its state "1". The aspects or colours of "0" and "1" may be varied by a judicious choice of the total birefringence that is to say the thickness along the light path of the two crystals. One may also obtain other colours complementary to the first through insertion of a polariser 8a between the active crystal 1 and the reflecting surface 6 in a position crossed relative to polariser 8, that is to say the direction of polarisation of the second polariser makes an angle of 90° to that of the first polariser. One may also obtain different coloured aspects for the states "1" and "0" if the chemical composition of the two crystals is different. For example the compensating crystal might be made from birefringent quartz.

A somewhat different principle of operation may be as follows: crystals 1 and 7 are ferroelectric crystals having a natural optical activity for which the sign may be changed by switching of the spontaneous polarisation $P_r$. The arrangement is similar to that as previously described with however one restriction, the provision of the second polariser 8a is essential. In the state "0" the optical activities of crystals 1 and 7 are of opposite sign so that the total rotation is zero if the crystals have the same thickness and the light does not pass through the second polariser. It is thus not sent back by the reflecting surface 6 and the system appears black. By application of a suitable voltage pulse to the active crystal 1 in order to obtain the state "1" the polarisation $P_s$ is inverted and consequently the sign of its optical activity. The total activity is thus no longer zero and becomes equal to double the activity of each crystal if both have the same thickness. The polarisation plane of a portion of the light (depending on the wave length) will be turned and this portion of the spectrum will pass through the second polariser, will be sent back and will emerge from the system with a coloured aspect different from the state "0". Through suitable choice of the thickness of the crystals through which the light passes one may choose the colour of the state "1" so as to obtain a maximum contrast.

Such a system may be realized through use of crystals of sodium nitrite $NaNO_2$ for example.

Figure 2:
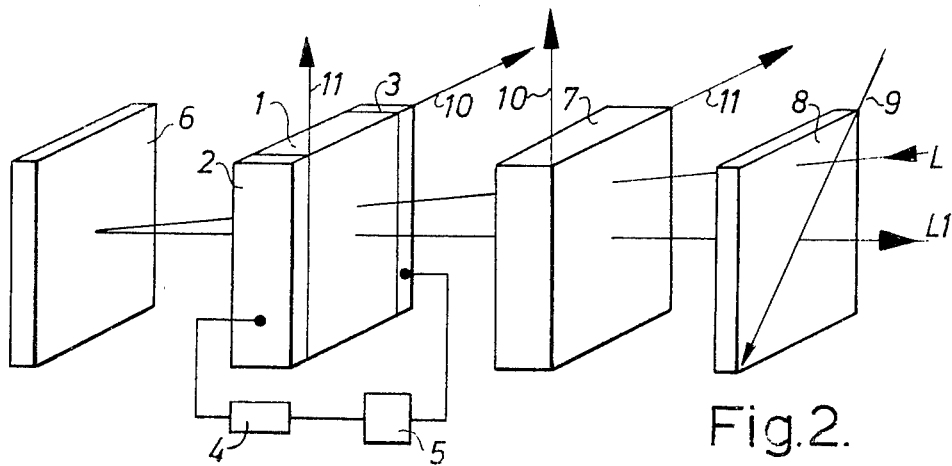
FIG. 2 is a schematic view of an arrangement wherein a solid crystal is activated by means of electrodes producing an electric field transverse to the light beam.

In a variant of the invention according to FIG. 2 the arrangement of the elements is similar to FIG. 1 with however a difference in placing electrodes 2 and 3 which are no longer necessarily transparent and which in this case produce an electric field perpendicular to the light beams L and $L_1$. In this variant one may also use sodium nitrite crystals for example.

Figure 3:
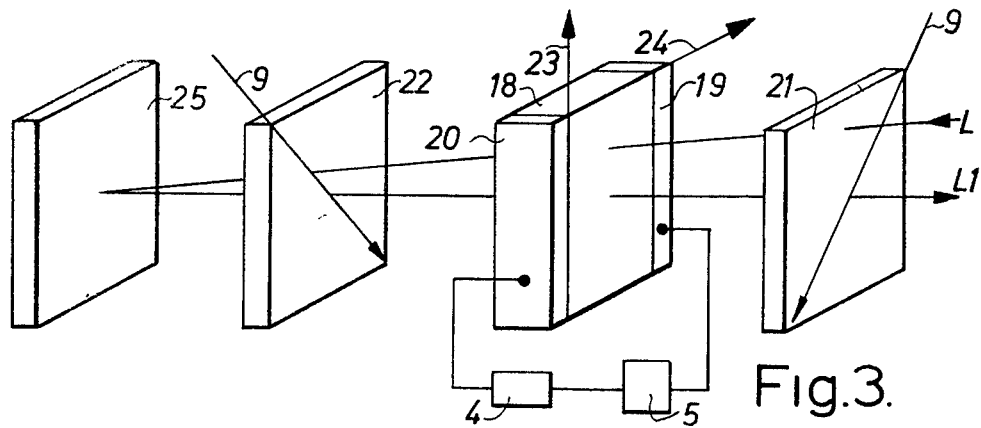
FIG. 3 shows a further variant in which a solid crystal is located between two polarisers.

In the version shown in FIG. 3 the arrangement includes a ferroelectric crystal 18 which may be electrically activated by means of electrodes 19 and 20 coupled to the control circuit 4 and the source 5. The crystal 18 is placed between two polarisers 21 and 22 crossed or parallel.

The arrangement further includes a reflecting or diffusing surface 25 which returns the light beam L in the direction $L_1$.

Herein the principle is that in the state "0" the principal fast and slow axes 23 and 24 respectively of the crystal are parallel to the direction of polarisation 9 of polarisers 21 and 22. The state of polarisation of the light is thus not changed by the crystal and the light either traverses or is blocked by polariser 22 according to whether the light is parallel or perpendicular to the polariser 21. The system thus may appear clear or black. In order to arrive at state "1" the spontaneous polarisation $P_s$ of the crystal or one of its components is inverted by means of a voltage pulse of polarity suitably chosen. This inversion of P is accompanied by a switching of the optical indicatrix, thus the fast and slow axes 23 and 24 are no longer parallel to the directions of polarisation 9 of polarisers 21, and 22. The state of polarisation of the light is modified by crystal 18 and a portion of the spectrum does not pass through the polarisers. The system thus has a coloured aspect different from the corresponding aspect of the state "0". The colour of state "1" may be chosen through a judicious choice of the thickness of the crystal through which the light passes.

In a practical example crystal 18 may be a foil of bismuth titanate $Bi_4Ti_3O_{12}$ cut in a manner such that the tabular faces a–b or 001 may be covered by electrodes 19 and 20 in a manner such that bipolar tension is applied parallel to the crystallographic axis c = 001 and may switch the component c of the spontaneous polarisation. The crystal is cut and oriented in a manner such that its fast and slow axes corresponding to a wave length of the spectrum of light suitably chosen, are parallel to the direction of polarisation of the polarisers in the initial state. The inversion of component c of the polarisation $P_s$ causes a rotation of the fast and slow axes through an angle which varies with the wave length, in view of the dispersion such angle being between 30° and 50°.

A variant of FIG. 3 may have a similar arrangement of elements to that just described except that the crystal 18 is provided with transparent electrodes which provide an electric field parallel to the light beam L or $L_1$.

Figure 4:
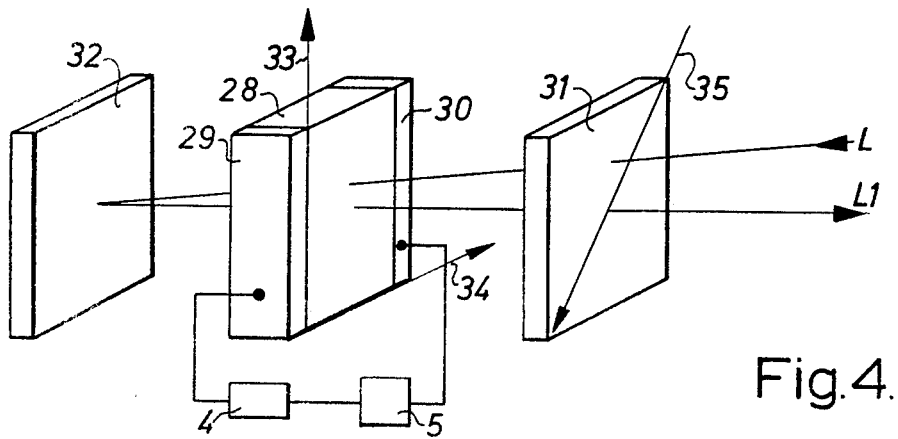
FIG. 4 shows an arrangement wherein the crystal is between an polariser and a reflecting or diffusing surface.

In the version of the invention corresponding to FIG. 4, the polariser 22 is eliminated, and electrodes 29 and 30 provide an electric field transversal to the light beam L or $L_1$. Herein it is, of course, likewise possible to use transparent electrodes which produce an electric field parallel to the light beam.

Figure 5:
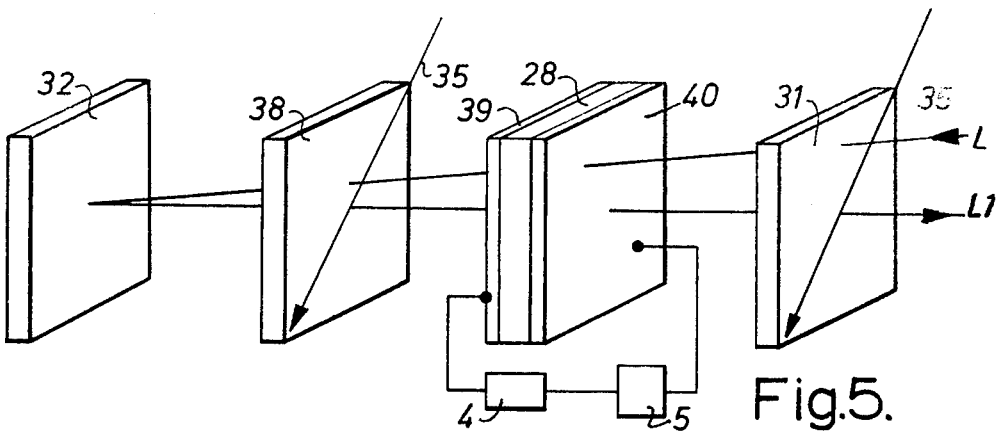
FIG. 5 is a variant of the arrangement according to FIGS. 3 and 4 in which the crystal is activated by a field parallel to the light beam and is placed between two polarisers.

In FIG. 5 the polariser 38 is placed between the reflecting surface 32 and the crystal 28.

As shown in FIG. 5, crystal 28 is provided with electrodes 39 and 40 activated by the control circuit 4 and energy source 5 so as to provide an electric field parallel to the light beam. This form may likewise have electrodes as in FIG. 4 which provide a transverse electric field.

In all the forms shown as well as their variants hereinbefore described, the passage from one state to another is obtained by application of an electric pulse having an amplitude and duration appropriate to the substance forming the active crystal. The inverse change-over is obtained through application of a pulse of opposite polarity to that of the first. The system remains in the state to which it has been switched without the necessity of continuously applying the voltage.

It switches to the other state only under the influence of a second pulse having a polarity opposite to that of the first. Such a system thus provides a storage effect.

One may use for the systems hereinbefore described ferroelectric crystals having a weak coupling or no coupling to their ferroelastic properties where switching of a component of spontaneous polarisation or of the whole spontaneous polarisation is accompanied by a switching of the optical indicatrix, thus switching through an angle different from 180° of the fast and slow axes of a suitably chosen cut, or passage from one section of the indicatrix to a different section of the same indicatrix results or ferroelectric crystals belonging to one of the enantiomorphous classes 1, 2, 4, 3, or the polar non-enantiomorphous m, mm2 in which optical activity exists, for which the rotation sense may be inverted by inversion of the spontaneous polarisation.

In the first category may be mentioned bismuth titanate $Bi_4Ti_3O_{12}$.

In the second category may be mentioned sodium nitrite $NaNO_2$ and lead germanate $Pb_5Ge_3O_{11}$ and in general all crystals having polar symmetry in enantiomorphous and non-enantiomorphous classes which exhibit the phenomenon of ferroelasticity, notably crystals having symmetry: $1 = C_1$, $2 = C_2$, $m = C_{1h}$, $mm2 = C_{2v}$, $4 = C_4$, $3 = C_3$.

One may, of course, in all of the various forms described, add a coloured filter of the interference or absorbant variety associated with a polariser for the purpose of absorbing coloured light in one of the states "1" or "0", thus bringing about a more complete extinction and an increase of contrast.

What I claim is:

1. Display arrangement exhibiting a storage effect for use with an electronic timepiece which timepiece includes a time standard, an electronic control circuit, an energy source and voltage increasing means wherein is provided one single domain ferroelectric monocrystal belonging to a relatively low symmetry group in order to assure different optical properties for different orientation domains selected from the group consisting of sodium nitrate, lead germanate, bismuth titanate, and crystals having polar symmetry in enantiomorphous and non-enantiomorphous classes having symmetry: $1=C_1$, $2=C_2$, $m=C_{1h}$, $mm2=C_{2v}$, $4=C_4$, $3=C_3$, electrode means arranged and adapted to apply voltage pulses from the control circuit to the crystal thereby to cause said crystal to change in a reversible manner from a first to a second stable state, said first and second stable states being optically different, at least one polarizing filter located proximate one face of the crystal, a reflecting surface located proximate the opposite face thereof, and a second ferroelectric monocrystal of substantially the same composition, cut, and crystallographic orientation as said one ferroelectric monocrystal positioned between said polarizing filter and said reflecting or diffusing surface to constitute a passive compensating crystal, said reflecting surface being positioned and adapted to receive light passing through both said ferroelectric monocrystals and to reflect said light back through both said ferroelectric monocrystals.

2. Display arrangement as in claim 1 wherein the crystal is of the ferroelectric type in which a change of latent polarisation or a component thereof as referred to a crystallographic axis is accompanied by a change of the optical indicatrix about an axis through an angle greater than o and less than $\pi$.

3. Display arrangement as in claim 1 wherein the crystal is of the ferroelectric type having an inherent optical activity and is defined by one of the following point symmetry groups: $1 = C_1$, $m = C_{1h}$, $2 = C_2$, $mm2 = C_{2v}$, $4 = C_4$, $3 = C_3$.

4. Display arrangement as in claim 1 wherein the display includes a second polariser located between the reflecting or diffusing surface and the active crystal.

5. Display arrangement as in claim 4 wherein the active crystal is transparent in the domain of visible electromagnetic radiation and is provided with electrode means arranged and adapted to apply an electric field transversal to light beams passing therethrough.

6. Display arrangement as in claim 4 wherein the active crystal is transparent in the domain of visible electromagnetic radiation and is provided with transparent electrode means arranged and adapted to apply an electric field parallel to light beams passing therethrough.

7. Display arrangement as in claim 1 wherein is included an active crystal having a thickness corresponding to a quarter wave length for a wave length of the visible spectrum and provided with electrode means arranged and adapted to apply an electric field thereto transversal to a light beam passing therethrough, the crystal being placed between a polariser and a reflecting or diffusing surface.

8. Display arrangement as in claim 1 wherein is included an active crystal having a thickness corresponding to a quarter wave length for a wave length of the visible spectrum and provided with transparent electrode means arranged and adapted to apply an electric field thereto parallel to a light beam passing therethrough, the crystal being placed between a polariser and a reflecting or diffusing surface.

9. Display arrangement as in claim 1 wherein a coloured filter is associated with one of the polarisers.

10. Display arrangement as in claim 1 wherein the crystal is a bismuth titanate crystal.

* * * * *